US 6,719,348 B1

(12) United States Patent
Song

(10) Patent No.: US 6,719,348 B1
(45) Date of Patent: Apr. 13, 2004

(54) COVERING FOR USE WITH A MOTOR VEHICLE

(75) Inventor: Yu-Jin Song, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/285,172

(22) Filed: Oct. 31, 2002

(51) Int. Cl.[7] .............................................. B62D 25/20
(52) U.S. Cl. ................ 296/39.1; 296/97.23; 296/37.14; 296/37.16
(58) Field of Search ........................ 296/25, 208, 37.2, 296/37.14, 37.16, 38, 39.1, 39.2, 97.23; 15/215, 216; D12/203

(56) References Cited

U.S. PATENT DOCUMENTS

| 2,650,855 A | * | 9/1953 | Pierce ...................... 296/97.23 |
| 3,149,875 A | * | 9/1964 | Stata ....................... 296/97.23 |
| 3,654,657 A | | 4/1972 | Hubel |
| 3,669,817 A | | 6/1972 | McDevitt |
| 4,279,439 A | | 7/1981 | Cantieri |
| 4,377,610 A | | 3/1983 | McClung, Jr. |
| 4,765,670 A | * | 8/1988 | Jackson .................... 296/97.23 |
| 4,917,932 A | | 4/1990 | McClung |
| 5,254,384 A | * | 10/1993 | Gordon .................... 296/97.23 |
| 5,419,602 A | | 5/1995 | VanHoose |
| 5,725,926 A | | 3/1998 | Wang |
| 5,806,909 A | | 9/1998 | Wise |
| 6,238,765 B1 | | 5/2001 | Bailey et al. |
| D467,532 S | * | 12/2002 | Kraines ..................... D12/203 |
| 2001/0040382 A1 | * | 11/2001 | Nemoto .................... 296/37.14 |
| 2002/0070574 A1 | * | 6/2002 | Carlsson et al. ......... 296/37.14 |

FOREIGN PATENT DOCUMENTS

| GB | 2 104 777 A | | 3/1983 |
| JP | 403284432 A | * | 12/1991 |

OTHER PUBLICATIONS

"J.C. Whitney", Catalog No. 586A, Jan. 1996, p. 97.*

* cited by examiner

Primary Examiner—Jason Morrow
(74) Attorney, Agent, or Firm—Bill C. Panagos

(57) ABSTRACT

A covering for use with a motor vehicle. The covering has a channel and multiple sloped grooves. The grooves slope toward the channel for directing fluid toward the channel.

21 Claims, 3 Drawing Sheets

US 6,719,348 B1

COVERING FOR USE WITH A MOTOR VEHICLE

BACKGROUND OF THE INVENTION

1. Field of the Invention

The present invention relates to coverings for use with a motor vehicle.

2. Background Art

Motor vehicles include an number of storage areas for storing items. Any number of wet, dry, sharp, soft, large, and small items may be stored. A typical storage area is configured to accommodate stored items without damaging the items or the storage area. A covering is placed over a portion of the storage area and the stored items are positioned on top of the covering to separate the stored items from the storage area. The covering helps prevent the storage area and the stored items from damaging each other.

SUMMARY OF THE INVENTION

One aspect of the present invention relates to a covering for use with a motor vehicle having an interior. A main body of the covering is positionable in the interior. The covering includes a channel and multiple sloped grooves that slope toward the channel. The channel and grooves cooperate to direct fluid.

In addition, the main body may include a hinge joint that allows portions of the covering to be movable. Furthermore, a fabric layer may be attached to a side of the main body opposite the channel and the grooves.

Another aspect of the present invention relates to a vehicle having an interior storage area including a collection sump for collecting fluid. The vehicle further includes a covering disposed in the storage area. The covering has a main body that includes a channel and sloped grooves. The grooves slope toward the channel, and the channel slopes toward the sump for directing fluid toward the sump.

In addition, the storage area may include a lower storage section that the covering is configured to at least partially cover. Furthermore, the covering may include a hinge joint that allows one portion of the main body to move with respect to another portion of the main body for accessing the lower storage section.

DETAILED DESCRIPTION OF THE PREFERRED EMBODIMENT(S)

Figure 1:
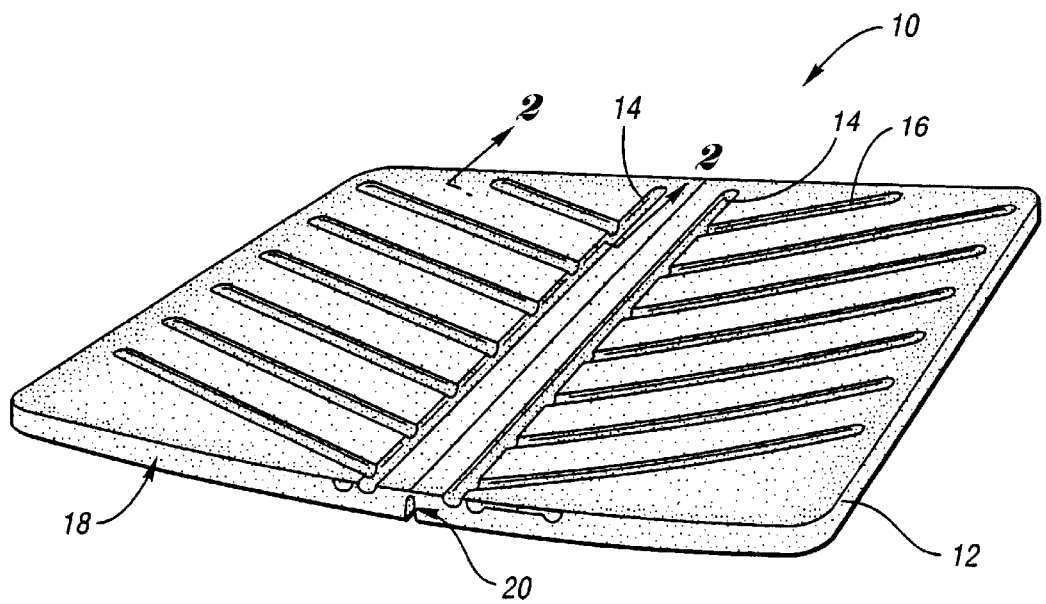
FIG. 1 illustrates a covering for use in a motor vehicle, in accordance with the present invention.

FIG. 1 illustrates a covering 10 for use in a motor vehicle. The covering 10 is positionable in a storage area of the vehicle and is configured to receive stored items thereon. The covering 10 may also be configured to separate the stored items from a portion of a storage area underneath the covering 10, as explained below in greater detail.

The covering 10 includes a main body 12. The main body 12 may comprise any suitable material, such as a rigid, semi-rigid, or pliable material. The material may be waterproof for receiving wet items on the covering 10. In particular, the material may include plastic, nylon, polypropylene, polyethylene, thermo plastic glastomer, thermoplastic olefin, vinyl, or any other type.

The main body 12 includes one or more channels 14 and one or more sloped grooves 16. The embodiment shown in FIG. 1 includes two channels 14 and a number of sloped grooves 16. The grooves 16 are sloped toward a respective channel 14, and the channels 14 are sloped toward an edge 18 of the main body 12. The sloped channel 14 and the sloped grooves 16 are sufficiently sloped for directing fluid. Fluid that enters one of the grooves 16 is directed to the channel 14. The channel 14 receives the directed fluid from a number of grooves 14 and directs the received fluid toward the edge 18.

In addition, the main body 12 may include an optional hinge joint 20 that is configured to allow the main body 12 to be folded for access to items under the covering 10, for assistance with storing the covering 10, and for assistance with flipping over the covering 10. The embodiment shown in FIG. 1 includes the hinge joint 20 disposed between the channels 14, but the hinge 20 could be anywhere.

Figure 2:
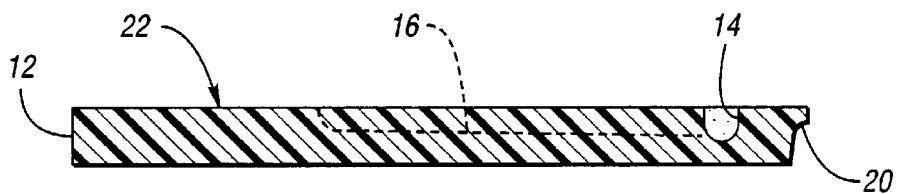
FIG. 2 illustrates a cross-sectional portion of a main body of the covering, in accordance with the present invention.

FIG. 2 illustrates a cross-sectional portion of the main body 12 that highlights one type of gradient for the sloped channels 14 and grooves 16. An upper surface 22 supports items placed on top of the main body 12. The channels 14 and the grooves 16 extend below the upper surface 22. Fluid that leaks on to the main body 12, from stored items for example, collects in recesses created by the channels 14 and grooves 16 so that the leaking fluid does not spread to items stored on other portions of the covering.

Figure 3:
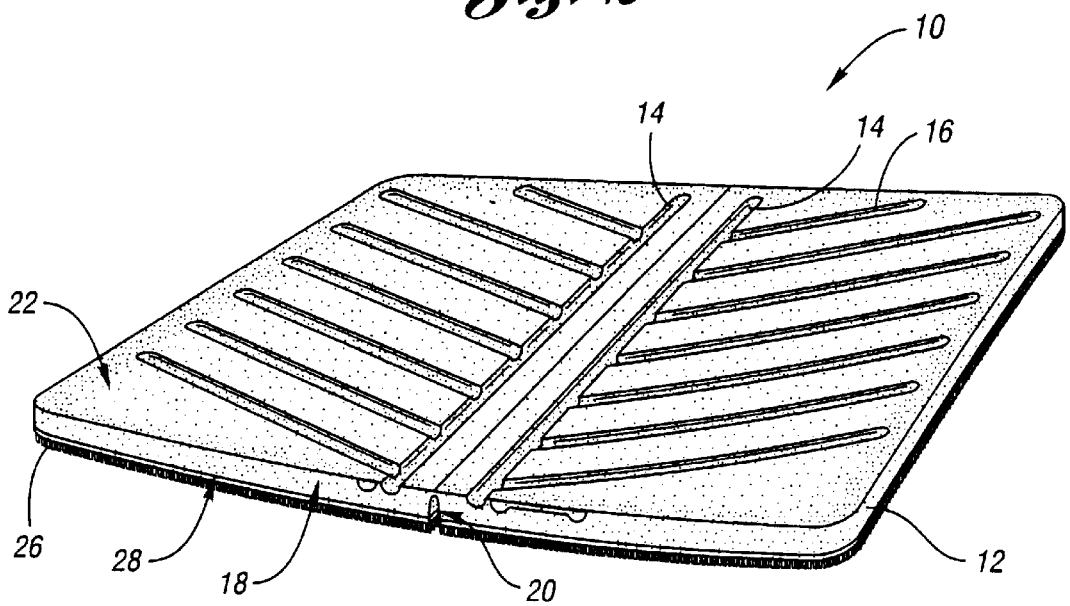
FIG. 3 illustrates the covering further including an optional fabric layer, in accordance with the present invention.

FIG. 3 illustrates the covering 10 further including an optional fabric layer 26 secured to a fabric side 28 of the main body 12 opposite the upper surface 22. The fabric layer 26 may comprise any suitable material, such as woven or non-woven polyester, nylon, or other type. The fabric layer 26 may be useful when storing dry or sensitive items, for example. With such a configuration, the covering 10 may be reversible for exposing the fabric layer 26 or the upper surface 22 of the main body 12. Such flexibility allows the covering 10 to be easily removed and flipped over to accommodate dry and wet items.

Figure 4:
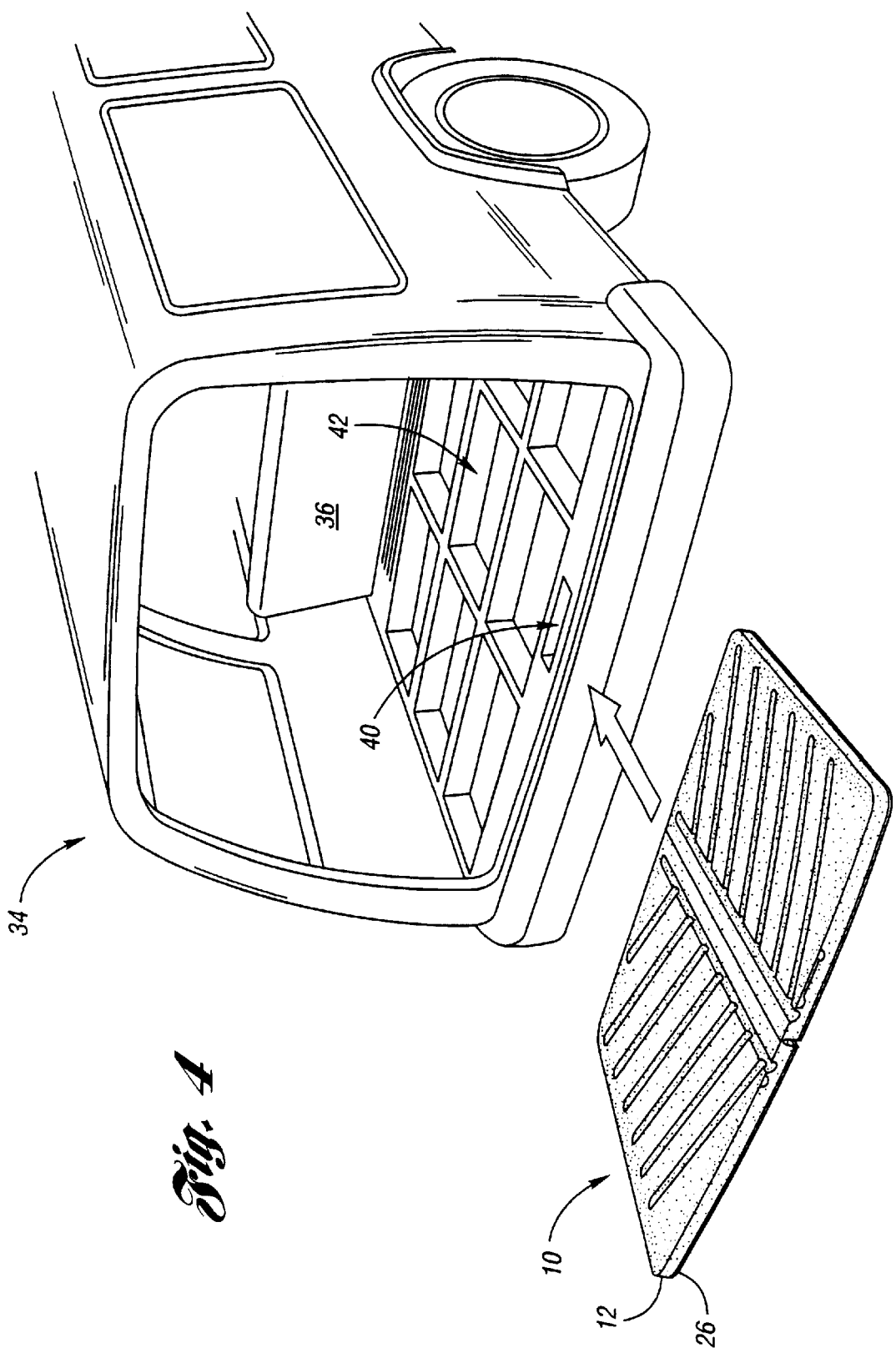
FIG. 4 illustrates a vehicle having an interior storage area, in accordance with the present invention.
Figure 5:
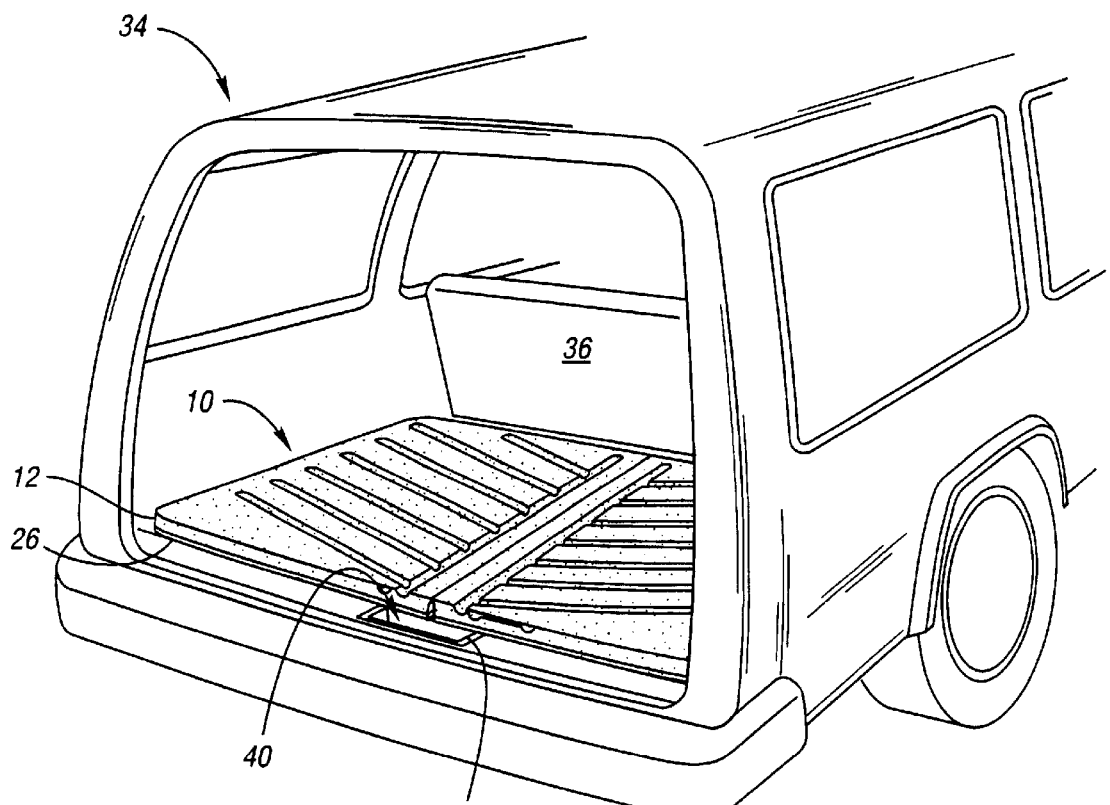
FIG. 5 illustrates the covering configured to cover a portion of the storage area, in accordance with the present invention.

FIG. 4 illustrates a vehicle 34 having an interior storage area 36 for receiving the covering 10. The storage area 36 includes a sump recess 40 and optional lower storage sections 42. As shown in FIG. 5, the covering 10 is configured to cover at least a portion of the storage area 36. The edge 18 of the main body 12 toward which the channels 14 direct the fluid is proximate a sump 46 inserted in the sump recess 40. The sump 46 is removable for dumping out the fluid.

Figure 6:
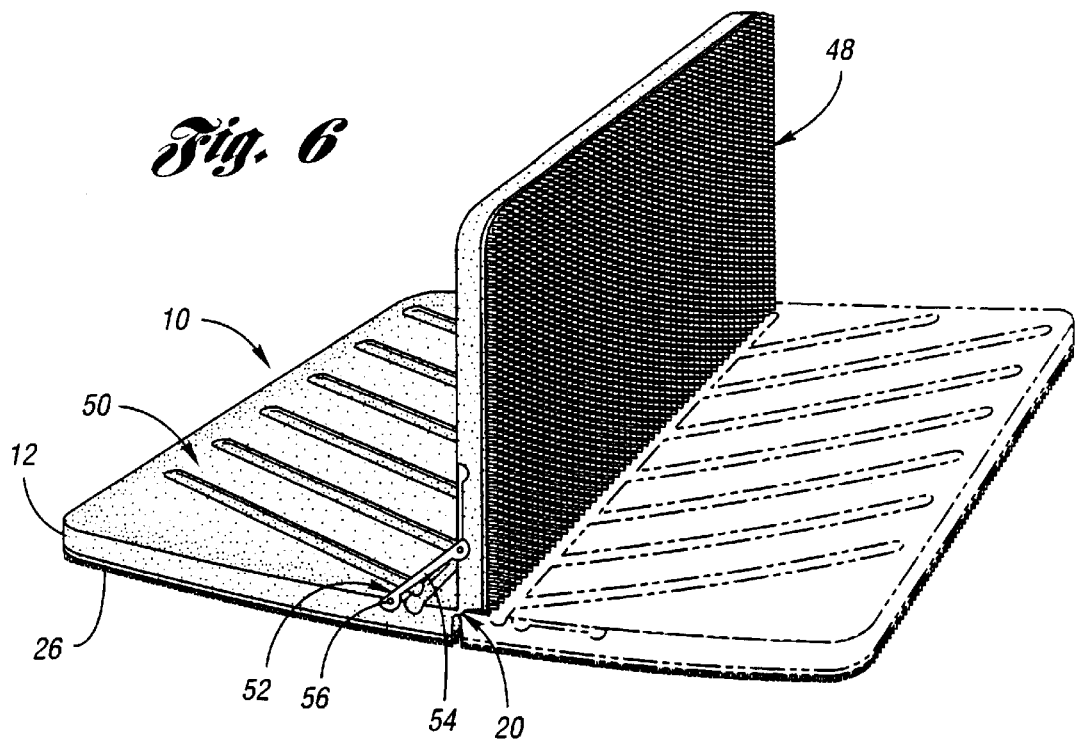
FIG. 6 illustrates the covering including an optional latch arrangement, in accordance with the present invention.

FIG. 6 illustrates the covering 10, including the optional hinge joint 20, in operation. The hinge joint 20 may be a living hinge formed integral with the main body 12 that allows a first portion 48 of the main body 12 to move with respect to a second portion 50. If the vehicle 34 includes the lower storage sections 42, or some other lower storage section, the hinge joint 20 would allow access to items stored in the storage recesses 42 without having to remove the covering 10. Usually, the main body 12 when used to cover the lower storage recesses 42 comprises a rigid or semi-rigid flooring material for storing items on the covering 10. Alternatively, the vehicle 34 may include only a floor (not shown) in the storage area 36, and not the lower storage recesses. The covering 10 over the floor may comprise a pliable material.

An optional latch arrangement 52 may be provided on the main body 12, or other portion of the covering 10, for supporting the first portion 48 in a desired position with respect to the second portion 50. The latch arrangement 52 shown includes a latch 54 and a catch 56. The latch 54 engages the catch 56 to support the first portion 48 in a upright position that is substantially perpendicular to the second portion 50. The latch arrangement allows the covering 10 to separate the storage area 36 so that wet and dry items can be separated on either side of the upright portion at the same time. The latch arrangement 52 may be configured to support the first portion 48 or the second portion 50 in any desired position.

The covering 10 may be manufactured in any suitable manner. For example, the main body 12 may be compression molded or injection molded. Furthermore, the fabric layer 26, if used, may be insert molded with the main body 12, or attached to the main body 12 after molding, such as with an adhesive.

While embodiments of the invention have been illustrated and described, it is not intended that these embodiments illustrate and describe all possible forms of the invention. Rather, the words used in the specification are words of description rather than limnitation, and it is understood that various changes may be made without departing from the spirit and scope of the invention.

What is claimed is:

1. A covering for use with a motor vehicle having an interior, the covering comprising:
    a rigid main body positionable in the interior of the motor vehicle, the rigid main body including a channel and multiple sloped grooves that slope toward the channel for directing fluid toward the channel; and
    a hinge joint that allows a first rigid portion of the rigid main body to move with respect to a second rigid portion of the rigid main body between a first position and a second position.

2. The covering of claim 1 wherein the first portion of the main body is coplanar with the second portion when the first portion is in the first position, and wherein the first portion is substantially perpendicular to the second portion when the first portion is in the second position.

3. The covering of claim 2 further comprising a latch arrangement on the main body, the latch arrangement including a catch and a latch engageable with the catch for supporting the first portion of the main body in the second position.

4. The covering of claim 3 further comprising a fabric layer secured to a side of the main body opposite the channel and the sloped grooves.

5. The covering of claim 1 wherein the main body includes a channel on each side of the hinge joint and sloped grooves on each side of the hinge joint that slope toward a respective channel.

6. The covering of claim 5 wherein each channel slopes toward an edge of the main body.

7. The covering of claim 6 wherein the main body comprises a rigid flooring material.

8. The covering of claim 1 further comprising a fabric layer secured to a side of the main body opposite the channel and the sloped grooves.

9. The covering of claim 8 wherein the main body defines a waterproof side including the channel and the sloped grooves, and the covering is reversible for exposing the waterproof side or the fabric layer.

10. A vehicle comprising:
    an interior storage area having a collection sump for collecting fluid;
    a rigid covering disposed in the storage area and having a main body including a channel in fluid communication with the sump, and multiple sloped grooves that slope toward the channel for directing fluid toward the channel; and
    a hinge joint that allows a first rigid portion of the rigid main body to move with respect to a second rigid portion of the rigid main body between a first position and a second position, to thereby allow access to a lower storage section.

11. The vehicle of claim 10 wherein the covering is configured to cover at least a portion of the lower storage section.

12. The vehicle of claim 10, wherein the first portion is coplanar with the second portion when the first portion is in the first position, and wherein the first portion is substantially perpendicular to the second portion when the first portion is in the second position.

13. The vehicle of claim 12 further comprising a latch arrangement on the main body, the latch arrangement including a catch and a latch engageable with the catch for supporting the first portion of the main body in the second position.

14. The vehicle of claim 13 further comprising a fabric layer secured to a side of the main body opposite the channel and the sloped grooves.

15. The vehicle of claim 14 wherein the main body comprises a rigid flooring material.

16. The vehicle of claim 10 wherein the storage area includes a sump recess for receiving the collection sump, and the collection sump is removable from the sump recess to discard fluid that collects in the collection sump.

17. The vehicle of claim 10 further comprising a fabric layer secured to a side of the main body opposite the channel and the sloped grooves.

18. The vehicle of claim 17 wherein the main body defines a waterproof side including the channel and the sloped grooves, and the covering is reversible for exposing the waterproof side or the fabric layer.

19. A covering for use with a motor vehicle having an interior, the covering comprising:
    a main body positionable in the interior of the motor vehicle, the main body including a sloped channel that slopes from a front to a rear of the main body and multiple sloped grooves that slope toward the channel for directing fluid toward the channel, wherein the slope of the channel descends from the front to the rear of the main body; and
    a hinge joint that allows a first rigid portion of the main body to move with respect to a second rigid portion of the main body between a first position and a second position.

20. The covering of claim 19 further comprising a second channel such that the main body includes a channel on each side of the hinge joint and sloped grooves on each side of the hinge joint that slope toward a respective channel.

21. A covering for use with a motor vehicle having an interior, the covering comprising:

a main body positionable in the interior of the motor vehicle, the main body including a channel and multiple sloped grooves that slope toward the channel for directing fluid toward the channel;

a hinge joint that allows a first portion of the main body to move with respect to a second portion of the main body between a first position and a second position;

a latch arrangement on the main body, the latch arrangement including a catch and a latch engageable with the catch for supporting the first portion of the main body in the second position.

\* \* \* \* \*